United States Patent [19]

Allen

[11] Patent Number: 5,048,943
[45] Date of Patent: Sep. 17, 1991

[54] EYEWEAR WITH REARVIEW MIRROR

[75] Inventor: James H. Allen, Covington, Ky.

[73] Assignee: 'totes', incorporated, Loveland, Ohio

[21] Appl. No.: 462,640

[22] Filed: Jan. 9, 1990

[51] Int. Cl.⁵ .............................................. G02C 7/14
[52] U.S. Cl. ...................................... 351/50; 359/880
[58] Field of Search .................. 351/50, 158; 350/638; 2/448, 449, 450

[56] References Cited

U.S. PATENT DOCUMENTS

| | | |
|---|---|---|
| 2,175,896 | 10/1939 | Jiranek . |
| 3,119,903 | 1/1964 | Rosemond et al. . |
| 3,423,150 | 1/1969 | Freed . |
| 3,988,058 | 10/1976 | Chaney et al. . |
| 4,105,183 | 8/1978 | Clark . |
| 4,349,246 | 9/1982 | Binner . |
| 4,603,944 | 8/1986 | Greenlaw et al. . |
| 4,798,454 | 1/1989 | Hyun . |

FOREIGN PATENT DOCUMENTS

| | | |
|---|---|---|
| 372365 | 3/1923 | Fed. Rep. of Germany ........ 351/50 |
| 496644 | 12/1938 | United Kingdom .................. 351/50 |
| 2104236 | 3/1983 | United Kingdom . |

*Primary Examiner*—Rodney B. Bovernick
*Attorney, Agent, or Firm*—Wood, Herron & Evans

[57] ABSTRACT

A rearview mirror is connected to a frame for the eyewear, the rearview mirror being movable between a use position spaced from the frame and a storage position juxtaposed to the frame. A seat is defined in the frame so that the mirror is receivable in that seat when in the storage position, thereby tending to minimize breakage of the device upon inadvertent contact with a user's hand or clothing when the mirror is stored.

18 Claims, 2 Drawing Sheets

5,048,943

EYEWEAR WITH REARVIEW MIRROR

FIELD OF THE INVENTION

This invention relates to eyewear.

Eyewear, as used herein, is considered a generic description of a product which is worn on a user's head over a user's eyes. Eyewear, for purposes herein, includes eyeglasses, goggles, helmets with eye openings, and the like. Eyewear may be primarily for protection purposes, e.g., goggles or sunglasses, and/or eyewear may be primarily for enhancement of visual recognition, e.g., reading glasses. And eyewear may or may not include eye lenses.

BACKGROUND OF THE INVENTION

It is known to the prior art to provide eyeglasses with a rearview mirror. In this regard, it is known to the prior art to provide heavy duty or protective eyeglass frames with a rearview mirror. Such a safety oriented eyewear product is known for use in the sport of competitive cycling, or may be used simply in recreational cycling. The rearview mirror, when in the use position, allows the cyclist to look to the rear while still keeping his head oriented forward, i.e., without turning his head, so as to determine, e.g., whether it is safe to turn left or right

SUMMARY OF THE INVENTION

It has been the primary objective of this invention to provide eyewear with a rearview mirror where the rearview mirror is movable between a use position spaced from the eyewear and a storage position juxtaposed to a temple piece of the eyewear, a seat being provided in the temple piece so that the mirror can be received in that seat when in a storage position. This objective provides a desirable advantage in that it tends to remove the rearview mirror from prospective inadvertent contact with a user's hand or clothing when in the storage position because the mirror is effectively integrated into the eyewear structure in that storage position.

BRIEF DESCRIPTION OF THE DRAWINGS

Other objectives and advantages of this invention will be more apparent from the following detailed description taken in conjunction with the drawings in which.

DETAILED DESCRIPTION OF THE INVENTION

Figure 1:
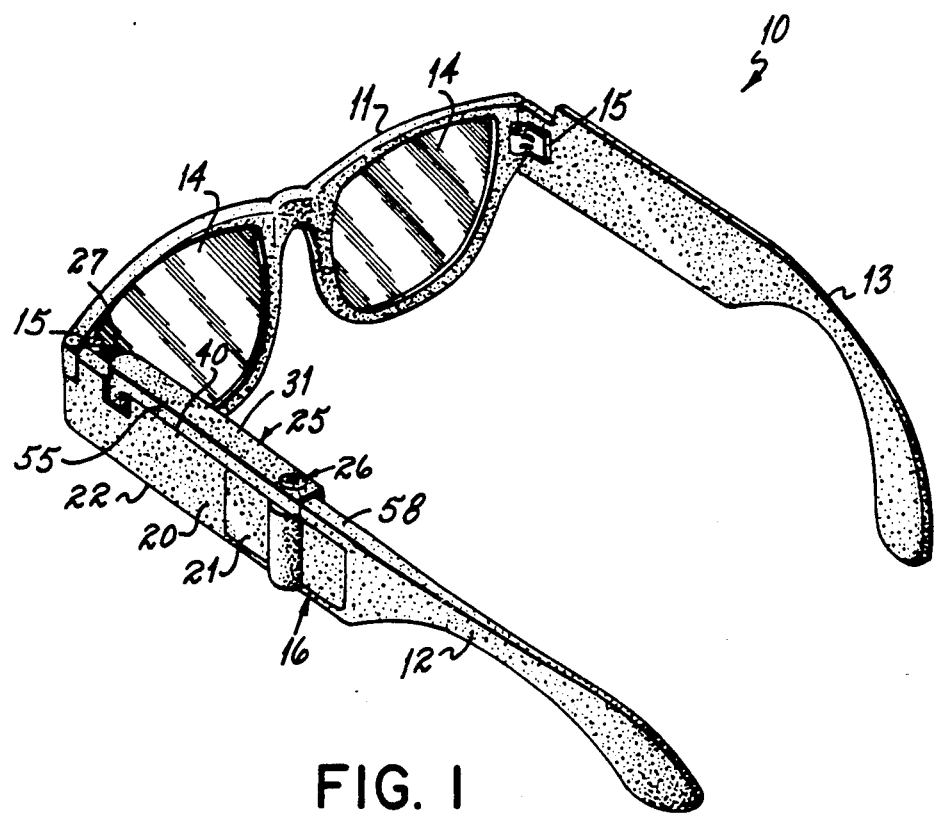
FIG. 1 is a rear perspective view of eyeglasses in accord with the principles of this invention, a rearview mirror being shown in the storage position.
Figure 2:
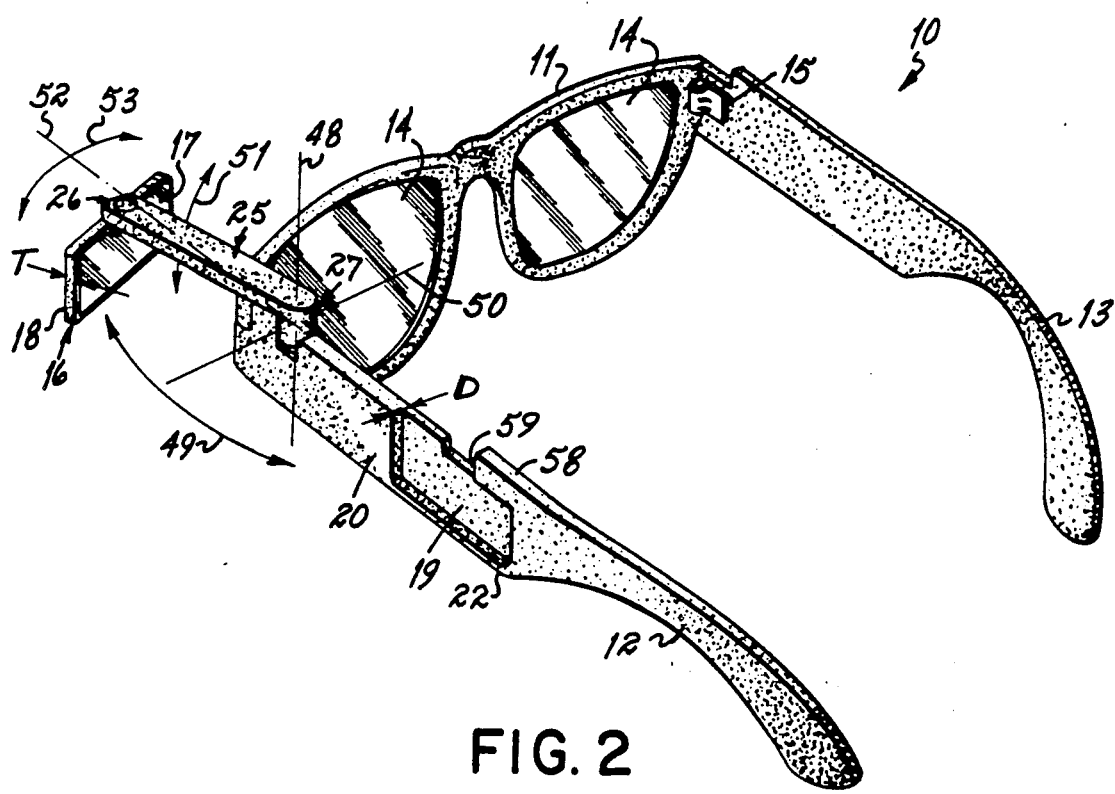
FIG. 2 is a rear perspective view similar to FIG. 1 but with the rearview mirror being shown in a use position.

Eyewear in accord with the principles of this invention is illustrated in FIGS. 1 and 2. This eyewear is in the form of eyeglasses 10 having a frame that includes lens frame 11 and two opposed side or temple pieces 12, 13. The lens frame 11 may carry tinted or non-tinted lenses 14, i.e., the eyeglasses may be sunglasses or not. And the lenses 14, of course, may be prescription lenses or not. Each temple piece 12, 13 is pivotally connected to the frame 11 by a hinge 15. Each temple piece 12, 13 is of a significant length so that it extends back over a user's ear in known fashion to retain the eyeglasses 10 in place on a user's head.

The rearview mirror structure, which is the subject of this invention, includes rearview mirror 16 connected with the left temple piece 12 as shown in the figures. The rearview mirror 16 includes a mirror 17 in a frame 18, the frame being of a generally rectangular configuration. This frame 18, as shown in FIGS. 1 and 2, cooperates with a seat 19 defined in the outboard surface 20 of the temple piece 12. The seat 19 is of a rectangular configuration analogous to that of the mirror frame 17, and is dimensioned so as to receive the rearview mirror 16 in stored relation therewith as shown in FIG. 1.

Figure 3:
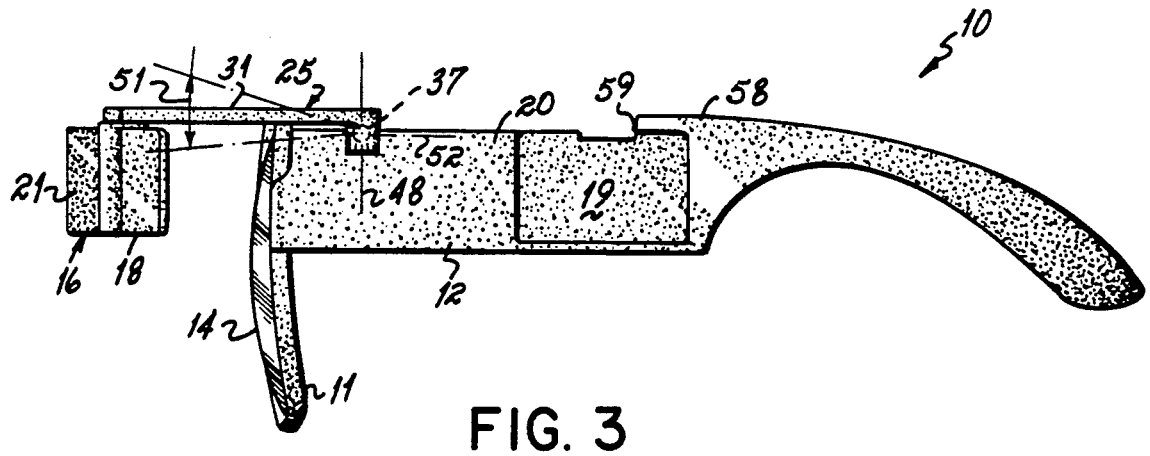
FIG. 3 is a side view of the eyeglasses with the rear view mirror shown in the use position illustrated in FIG. 2.

Note the thickness T of the mirror frame 18 is substantially equal to the depth D of the seat 19 defined in the outboard surface 20 of the temple piece 12. Accordingly, the surface of the mirror's rear wall 21 lies substantially flush with the outboard side wall surface 20 of the temple piece 12 when the mirror 16 is in storage position shown in FIG. 1. Note also, as shown in FIG. 3, that the seat's periphery 22 is fully within the confines of the temple piece. In other words, the configuration and size of the seat 19 is such that the mirror 16 is received wholly within the confines of the temple piece's periphery 22. Thus, inadvertent contact by a user's hand, or by a user's clothing, with the mirror 16 is less likely to occur than if the mirror was not so confined when the mirror is in the storage position. This, in turn, reduces the chance for potential stress on those joints (discussed in detail below) by which the mirror 16 is connected with the temple piece 12 when the mirror is in storage position such as might otherwise occur in the event of inadvertent contact with that temple piece or with the mirror.

Figure 4:
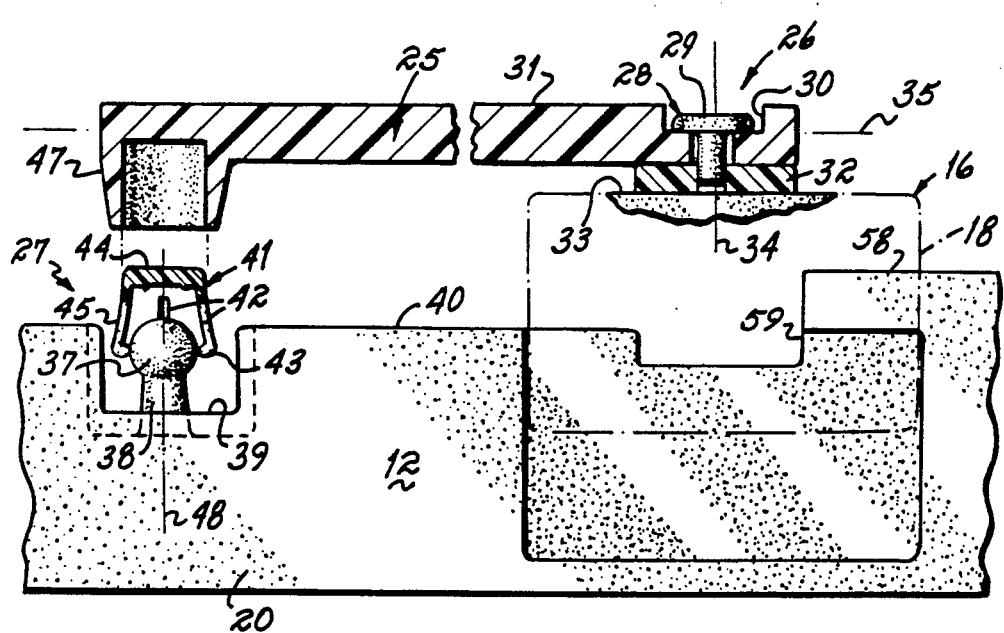
FIG. 4 is an exploded side view illustrating assembly of the rearview mirror with a temple piece of the eyeglasses.

A swing arm 25 is pivotally mounted by a first pivot joint 26 at one end to the mirror 16, see FIG. 4. The swing arm 25 is also pivotally mounted by a second pivot joint 27 at its other end to the temple piece 12, see FIGS. 4 and 5. The pivot joint 26 of the mirror 16 with the swing arm 25 is established by pin 28 rotatably secured in arm 25. The pin 28 is, in turn, secured to the mirror frame 18 by frictional engagement of a boss 32. The pin has a flatted head 29 received in recess 30 in the swing arm's top surface 31 at that one end, see FIG. 4. The boss 32 on the top edge 33 of the mirror frame 18 acts as a bearing surface between the mirror 16 and the swing arm 25. The pin 28 defines a pivot axis 34 oriented at right angles relative to the swing arm's longitudinal axis 35. Thus, the rearview mirror 16 is pivotable on that pivot axis 34 at the outer end of the swing arm 25.

Figure 5:
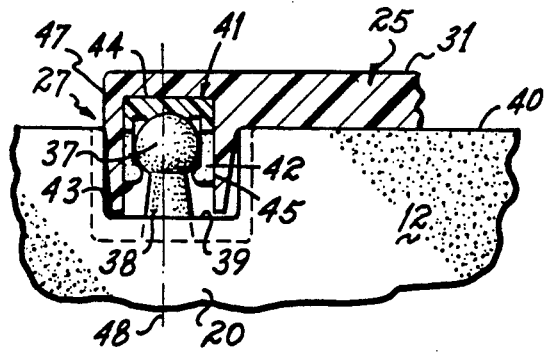
FIG. 5 is a view similar to FIG. 4 illustrating a swing arm for the rearview mirror in assembly with the temple piece.

The swing arm 25 is connected to the temple piece 12 by the ball joint 27 shown in FIGS. 4 and 5. The ball joint 27 includes a ball 37 formed integral with post 38 which in turn is formed integral with the temple piece 12. The ball 37 and post 38 are located in a recess 39 formed in the temple piece's top edge 40. A flexible inverted cup 41 is received over the ball 37, the cup being provided with slots 42 that extend from its edge 43 toward its base 44 at selected locations around its periphery so as to permit the cup's sides 45 to flex over the ball 37 as it is installed thereon. With the cup 41 installed on the ball 37, a boss 47 at the other end of the swing arm 25 is received on the cup in friction fit relation, compare FIGS. 4 and 5. The ball joint 27 at this other end of the swing arm 25 allows the swing arm to pivot between the storage and use positions, compare FIGS. 1 and 2, on a generally vertical 'y' axis 48 relative to ground as shown by motion arrows 49 when the glasses are being worn. However, that ball joint 27 also allows the swing arm 25 to pivot up and down on a 'z' axis 50 as shown by motion arrows 51 in FIGS. 2 and 3, and to pivot side to side on an 'x' axis 52 as shown by motion arrows 53, which axes 50, 52 are generally parallel to ground when the eyeglasses are being worn. This up three dimensional pivot motion 49, 51, 53 allowed by the ball joint 27 to the rear view mirror 16 allows the user to adjust the mirror in that position which provides maximum benefit relative to the purpose for which the mirror is intended when it is in the use position shown in FIG. 2.

The interconnection of the swing arm 25 with the temple piece 12 is also structured so that the swing arm 25, when in the retracted or storage position, overlies the top edge 40 of that temple piece, see FIG. 1. Thus, the swing arm 25 is less likely to be contacted by a user or a user's clothing when in the storage position which, in turn, minimizes potential stress on the ball joint 27 when the rearview mirror 16 is stored. This for the reason, of course, that the swing arm 25 is supported from underneath by the top edge 40 of the temple piece 12. And this also because the outboard edge 55 of the swing arm 25 when in the storage position is generally flush with the outboard surface 20 of the temple piece 12. Note also, as shown in FIG. 1, that the top surface 37 of the swing arm is co-extensive with the top edge 58 of the temple piece 12 when in the storage position. Thus, the temple piece's top edge 58 in effect defines a notch or seat 59 on which and in which the swing arm 25 is received when it is in storage position.

Having described in detail the preferred embodiment of my invention, what I desire to claim and protect by Letters Patent is:

1. Eyewear comprising
a frame adapted to be worn on a user's head,
a rearview mirror connected to said frame, said rearview mirror being movable between a use position spaced from said frame and a storage position juxtaposed to said frame,
a swing arm pivotally mounted by a first pivot joint at one end to said rearview mirror, said swing arm also being pivotally mounted by a second pivot joint at another end to said frame, and
a eat defined in said frame, said rearview mirror being receivable in said seat when in said storage position.

2. Eyewear as set forth in claim 1, the periphery of said seat being sized and configured substantially the same as the periphery of said rearview mirror.

3. Eyewear as set forth in claim 2, said seat being defined on the outboard surface of said frame.

4. Eyewear as set forth in claim 3, the rear surface of said mirror being generally flush with the outboard surface of said frame when said rearview mirror is in said storage position.

5. Eyewear as set forth in claim 1, said frame
a lens frame and a temple piece, said rearview mirror being pivotally joined to said temple piece.

6. Eyewear as set forth in claim 5, at least one of said first and second pivot joints comprising
a ball and socket joint.

7. Eyewear as set forth in claim 6, said second pivot joint comprising said ball and socket joint.

8. Eyewear as set forth in claim 1, said swing arm being generally aligned with said temple piece when said rearview mirror is in said storage position.

9. Eyewear as set forth in claim 8, said eyewear comprising
a notch defined in the top edge of said temple piece, said swing arm being located in said notch and overlying said temple piece's top edge when said rearview mirror is in said storage position.

10. A temple piece for eyeglasses, said temple piece comprising
a rearview mirror connected to said temple piece, said rearview mirror being movable between a use position spaced from said temple piece and a storage position juxtaposed to said temple piece, and
a seat defined in said temple piece, said rearview mirror being receivable in said seat when in said storage position.

11. A temple piece as set forth in claim 10, the periphery of said seat being sized and configured substantially the same as the periphery of said rearview mirror.

12. A temple piece as set forth in claim 11, said seat being defined on the outboard surface of said temple piece.

13. A temple piece as set forth in claim 12, the rear surface of said mirror being generally flush with the outboard surface of said temple piece when said rearview mirror is in said storage position.

14. A temple piece as set forth in claim 10 comprising
a swing arm pivotally mounted by a first pivot joint at one end to said rearview mirror, said swing arm also being pivotally mounted by a second pivot joint at another end to said temple piece.

15. A temple piece as set forth in claim 14, at least one of said first and second pivot joints comprising
a ball and socket joint.

16. A temple piece as set forth in claim 15, said second pivot joint comprising said ball and socket joint.

17. A temple piece as set forth in claim 14, said swing arm being generally aligned with said temple piece when said rearview mirror is in said storage position.

18. A temple piece as set forth in claim 17 comprising
a notch defined in the top edge of said temple piece, said swing arm being located in said notch and overlying said temple piece's top edge when said rearview mirror is in said storage position.

* * * * *